United States Patent
Kennedy et al.

(10) Patent No.: US 6,512,853 B2
(45) Date of Patent: *Jan. 28, 2003

(54) METHOD AND APPARATUS FOR COMPRESSING DIGITAL IMAGE DATA

(75) Inventors: Jonathan Marshall Thomas Kennedy, Malahide (IE); Simon Frederick Kennedy, Malahide (IE); Nicholas Paul Kennedy, Portmarnock (IE); David Marshall, Malahide (IE)

(73) Assignee: Barkfort Limited, Malahide (IE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/011,714
(22) PCT Filed: Aug. 13, 1996
(86) PCT No.: PCT/IE96/00052
§ 371 (c)(1),
(2), (4) Date: May 18, 1998
(87) PCT Pub. No.: WO97/07635
PCT Pub. Date: Feb. 27, 1997

(65) Prior Publication Data
US 2001/0028746 A1 Oct. 11, 2001

(30) Foreign Application Priority Data
Aug. 14, 1995 (IE) .................................................. 950613

(51) Int. Cl.$^7$ .............................. G06K 9/36; G06K 9/00
(52) U.S. Cl. ........................ 382/238; 382/239; 382/130; 382/132
(58) Field of Search ................................. 382/238, 239, 382/232, 236, 244, 245, 130, 132; 358/261.2

(56) References Cited

U.S. PATENT DOCUMENTS

| | | | | |
|---|---|---|---|---|
| 4,542,411 A | * | 9/1985 | Imanaka et al. | 358/430 |
| 4,809,350 A | | 2/1989 | Shimoni et al. | 382/238 |
| 4,941,194 A | | 7/1990 | Shimura | 382/238 |
| 5,524,067 A | * | 6/1996 | Miyake et al. | 382/238 |
| 5,663,764 A | * | 9/1997 | Kondo et al. | 382/238 |

FOREIGN PATENT DOCUMENTS

| | | | |
|---|---|---|---|
| EP | 0 096 220 | 12/1989 | H04N/1/41 |
| EP | 0 434 208 | 6/1991 | G06F/15/68 |
| EP | 0 479 563 | 4/1992 | G06K/9/36 |
| EP | 0 536 801 | 4/1993 | G06F/15/64 |
| FR | 2 524 740 | 10/1983 | H03K/13/24 |
| FR | 2700230 | 7/1994 | H04N/5/14 |

OTHER PUBLICATIONS

Pennebaker et al. "JEPG, still image data compression standard," Chapman & Hall, New York, 1993, pp. 10, 12–13, 15–17, 68–71, 73–77, 81, 92–93, 137–140, 325–330, 381, 495–496.*

(List continued on next page.)

*Primary Examiner*—Wenpeng Chen
(74) *Attorney, Agent, or Firm*—Nixon & Vanderhye P.C.

(57) ABSTRACT

A method for compressing digital image data with greyscale values comprises making at least three predictions of the greyscale value of each pixel and comparing the predicted values with the actual value of the pixel. The difference values between the respective predicted values and the actual value of each pixel is computed, and the median difference value of the three difference values is selected for bit coding. Bit coding is carried out by using variable length bit codes, the shortest length bit code being assigned to the most frequently occurring median difference value. The coded values of the median differences are bit packed, and in the case of a pixel where the absolute median difference value exceeds a predetermined value, the actual pixel value is bit packed.

39 Claims, 8 Drawing Sheets

OTHER PUBLICATIONS

Figures 1, 11, 12:
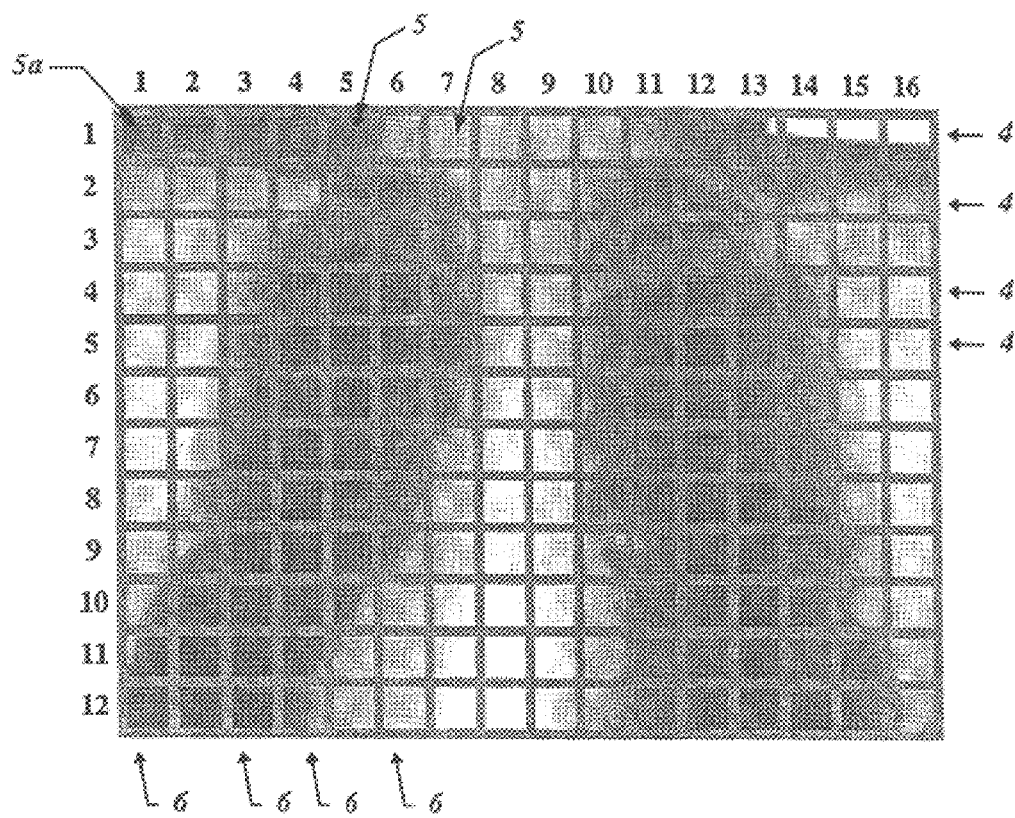

*Signal Processing of HDTV,* Proceedings of the Second International Workshop on Signal Processing of HDT, L'Aquila, Italy Feb. 29–Mar. 2, 1988.

*Signal Processing of HDTV. II,* Proceedings of the Third International Workshop on HDTV, Turin, Italy, Aug. 30–Sep. 1, 1989.

*Potential Digitization/Compression Techniques for Shuttle Video,* IEEE Transactions on Communications, vol. Com–26, No. 11, Nov., 1978.

*Performance of a Digital TV System,* Institute of Electrical and Electronics Engineers, NTC Record '72. National Telecommunications Conference, Dec. 4–6, 1972, Houston, Texas.

*Reversible Compression of Medical Images Using Decomposition and Decorrelation Methods,* Proceedings of the Asilomar Conference, Pacific Grove, Nov. 1–3, 1993, vol. 2 of 2.

*Data Compression of Gray–Scale Images by Level Plane Coding,* Electronics and Communications in Japan, Part 1, Jan. 1988, vol. 71, No. 1.

* cited by examiner

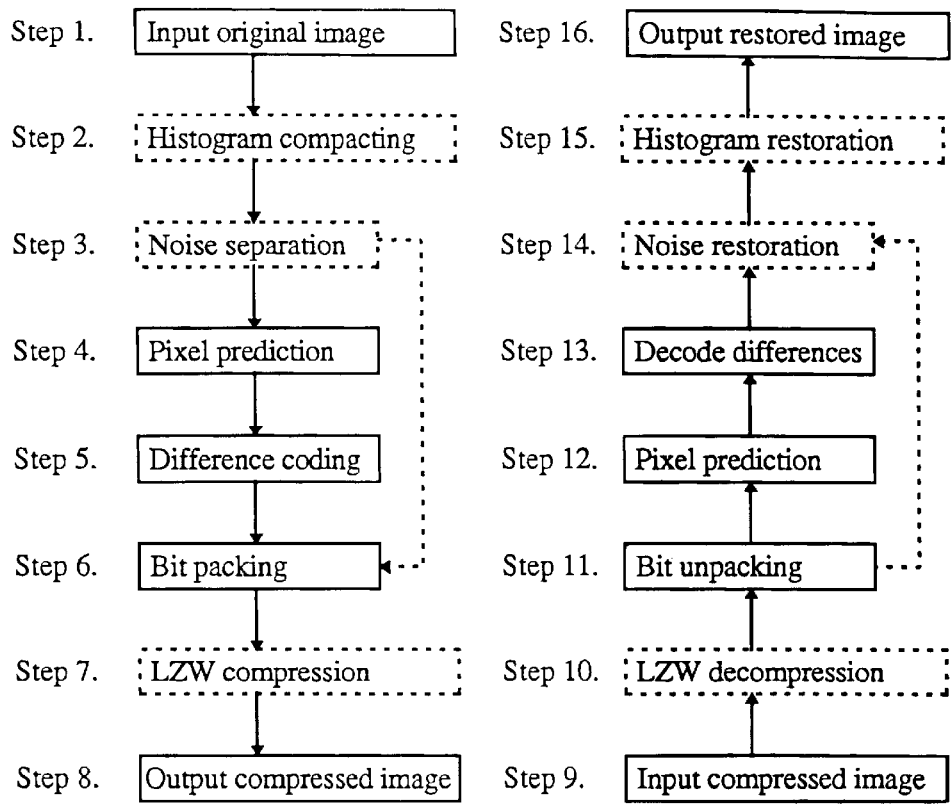
Fig. 2  Fig. 3
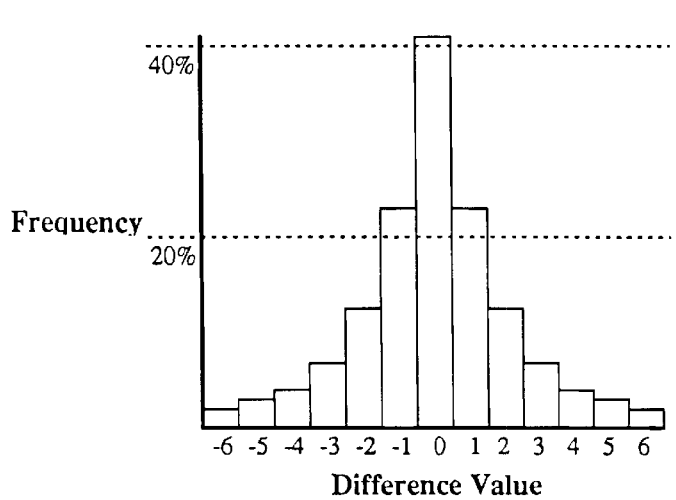
Fig. 10
| Difference | Bitcode |
|---|---|
| -6 | 11111100 |
| -5 | 1111100 |
| -4 | 111100 |
| -3 | 11100 |
| -2 | 1100 |
| -1 | 100 |
| 0 | 0 |
| +1 | 101 |
| +2 | 1101 |
| +3 | 11101 |
| +4 | 111101 |
| +5 | 1111101 |
| +6 | 11111101 |
| Lit 1 | 11111110 |
| Lit N | 11111111 |
Fig. 9

|  | Col. j-2 | Col. j-1 | Col. j | Col. j+1 | Col. j+2 | Col. j+3 | Col. j+4 | Col. j+5 | Col. j+6 | Col. j+7 | Col. j+8 | Col. j+9 |
|---|---|---|---|---|---|---|---|---|---|---|---|---|
| Row i-2 | $P_{(i-2,j-2)}$ | $P_{(i-2,j-1)}$ | $P_{(i-2,j)}$ | $P_{(i-2,j+1)}$ | $P_{(i-2,j+2)}$ | $P_{(i-2,j+3)}$ | $P_{(i-2,j+4)}$ | $P_{(i-2,j+5)}$ | $P_{(i-2,j+6)}$ | $P_{(i-2,j+7)}$ | $P_{(i-2,j+8)}$ | $P_{(i-2,j+9)}$ |
| Row i-1 | $P_{(i-1,j-2)}$ 17 | $P_{(i-1,j-1)}$ 32 | $P_{(i-1,j)}$ 45 | $P_{(i-1,j+1)}$ 55 | $P_{(i-1,j+2)}$ 76 | $P_{(i-1,j+3)}$ 150 | $P_{(i-1,j+4)}$ 147 | $P_{(i-1,j+5)}$ 157 | $P_{(i-1,j+6)}$ 171 | $P_{(i-1,j+7)}$ 172 | $P_{(i-1,j+8)}$ 166 | $P_{(i-1,j+9)}$ 149 |
| Row i | $P_{(i,j-2)}$ 11 | $P_{(i,j-1)}$ 26 | $P_{(i,j)}$ 41 | $P_{(i,j+1)}$ 54 | $P_{(i,j+2)}$ 71 | $P_{(i,j+3)}$ 104 | $P_{(i,j+4)}$ 137 | $P_{(i,j+5)}$ 157 | $P_{(i,j+6)}$ 164 | $P_{(i,j+7)}$ 170 | $P_{(i,j+8)}$ 195 | $P_{(i,j+9)}$ 180 |

(a)

Separated Noise Component (least significant 2 bits):

|  | j-1 | j | j+1 | j+2 | j+3 | j+4 | j+5 | j+6 | j+7 | j+8 | j+9 |
|---|---|---|---|---|---|---|---|---|---|---|---|
| i-1 | 0 | 1 | 3 | 0 | 2 | 3 | 1 | 3 | 0 | 2 | 1 |
| i | 2 | 1 | 2 | 3 | 0 | 1 | 1 | 0 | 2 | 3 | 0 |

(b)

Remaining Image Data (6 bits per pixel):

|  | j-1 | j | j+1 | j+2 | j+3 | j+4 | j+5 | j+6 | j+7 | j+8 | j+9 |
|---|---|---|---|---|---|---|---|---|---|---|---|
| i-1 | 8 | 11 | 13 | 19 | 37 | 36 | 39 | 42 | 43 | 41 | 37 |
| i | 6 | 10 | 13 | 17 | 26 | 34 | 39 | 41 | 42 | 48 | 45 |

(c)

Fig. 6

Differences Using Prediction $\hat{p}1$:

|  | j-1 | j | j+1 | j+2 | j+3 | j+4 | j+5 | j+6 | j+7 | j+8 | j+9 |
|---|---|---|---|---|---|---|---|---|---|---|---|
| i |  | +4 | +3 | +4 | +9 | +8 | +5 | +2 | +1 | +6 | -3 |

(a)

Differences Using Prediction $\hat{p}2$:

|  | j-1 | j | j+1 | j+2 | j+3 | j+4 | j+5 | j+6 | j+7 | j+8 | j+9 |
|---|---|---|---|---|---|---|---|---|---|---|---|
| i |  | -2 | -1 | 0 | -2 | -11 | -2 | 0 | -1 | -1 | +7 | +8 |

(b)

Differences Using Prediction $\hat{p}3$:

|  | j-1 | j | j+1 | j+2 | j+3 | j+4 | j+5 | j+6 | j+7 | j+8 | j+9 |
|---|---|---|---|---|---|---|---|---|---|---|---|
| i |  | +1 | +1 | -2 | -9 | +9 | +2 | -1 | 0 | +8 | +1 |

(c)

Median Difference (median of $\hat{p}1$, $\hat{p}2$ and $\hat{p}3$):

|  | j-1 | j | j+1 | j+2 | j+3 | j+4 | j+5 | j+6 | j+7 | j+8 | j+9 |
|---|---|---|---|---|---|---|---|---|---|---|---|
| i |  | +1 | +1 | -2 | -9 | +8 | +2 | -1 | 0 | +7 | +1 |

(d)

Fig. 8

$\hat{p}1\,[i,j] = p[i, j - 1]$   (a)

$\hat{p}2\,[i,j] = p[i - 1, j]$   (b)

$\hat{p}3\,[i,j] = p[i, j - 1] + (p[i - 1, j] - p[i - 1, j - 1])$   (c)

$median(\hat{p}1[i,j], \hat{p}2[i,j], \hat{p}3[i,j])$   (d)

$median(\hat{p}1[i,j], \hat{p}2[i,j], \hat{p}3[i,j], \hat{p}4[i,j], \hat{p}5[i,j])$   (e)

$median(\hat{p}1[i,j], \hat{p}2[i,j], \hat{p}3[i,j], \hat{p}6[i,j], \hat{p}7[i,j])$   (f)

Fig. 7

*Pass 1 - greyscale reduction and noise statistics*

```
func: extract greylevel frequency array 'freq[]'
            clear greylevel frequency array                                      1
            for each pixel in the image                                          2
                    increment pixel's greylevel frequency count                  3
            end for
      return freq[]
end func func: calculate greylevel reduction and restoration look-up-tables 'flut[]' & 'ilut[]'
            for each non-zero greylevel entry in the frequency array 'freq[]'
                    create an index in 'flut' to the next available greylevel in 'ilut'   4
                    create an index in 'ilut' to the non-zero greylevel                   5
            end for
      return 'flut[] & ilut[]'
end func func: calculate number of noise planes 'nr' using bitplane entropy statistics
            set 'nr' to zero
            for each bitplane (starting with the least significant)
                    calculate entropy statistic                                  6
                    calculate runs statistic                                     7
                    if either test indicates no noise then break for             8
                    increment 'nr'                                               9
            end for
            return 'nr'
end func
```

Fig. 13

*Pass 2 - image compression*

| | |
|---|---|
| proc: output image header information | |
|     output image width, height, bits per pixel, | 1 |
|     output number of noise bits 'nr', | 2 |
|     output greylevel restoration look-up-table 'ilut[]' | 3 |
| end proc | |

| | |
|---|---|
| proc: compress image | |
|     call extract greylevel frequency array 'freq[]' | 4 |
|     call calculate greylevel reduction and restoration functions 'flut[]' & 'ilut[]' | 5 |
|     call calculate number of noise planes 'nr' using bitplane entropy statistics | 6 |
|     call output image header information | 7 |
|     for each pixel in the image | |
|         apply the greyscale reduction function 'flut[]' | 8 |
|         extract the least significant 'nr' bits, if any. | 9 |
|         calculate the selected predictor using neighbourhood pixels | 10 |
|         compare predicted value with actual pixel value 'error' | 11 |
|         if absolute 'error' is less than or equal to 6 | 12 |
|             output corresponding unique variable length bitcode | 13 |
|         else if absolute 'error' is greater than 6 | |
|             output unique bitcode for literals | 14 |
|             output literal pixel value | 15 |
|         end if | |
|         output extracted 'nr' bits, if any. | 16 |
| end proc | |

Fig. 14

METHOD AND APPARATUS FOR COMPRESSING DIGITAL IMAGE DATA

The present invention relates to a method and apparatus for compressing digital image data.

Images are commonly stored and transmitted in digital form. Where such images include greyscale, the value of the greyscale of each pixel is provided in digital form, typically, in binary code. In images where a large range of greyscale values are required, for example, in X-rays, it is not unusual to code the greyscale levels in eight bit binary codes, thus giving 256 levels of greyscale. In general, such images are provided in raster format which comprise a plurality of horizontal scan lines, each line containing a plurality of individuals pixels, each of which is assigned a greyscale value which specifies the level of greyscale corresponding to that point in the image. Typically, the level of greyscale is defined in each pixel by an eight to twelve bit code. Because of the large number of bits which are used for defining the level of greyscale in each pixel, an image stored in raster format requires a relatively large storage capacity, and additionally, takes up a lot of bandwidth on communication channels for transmission of the image. Even in the case of a black and white image with greyscale, the storage capacity is high. In the case of colour images, where three primary colours and the corresponding intensities of the respective colours are required to define each pixel of a colour image, the storage capacity is increased by a factor of three. Various attempts have been made to compress such images, however, such attempts to date suffer from a number of disadvantages. Firstly, many compression methods are not lossless, in other words, between compression and decompression, part of the digital data making up the image is lost, and an accurate reconstruction of the image after decompression cannot be prepared. While in some applications such losses are acceptable, they are entirely unacceptable in many cases, typically, in images relating to medicine and diagnostic medicine, for example, X-rays and the like. Image compression systems which are essentially lossless suffer from the disadvantage that the compression ratio is relatively low, and thus in many cases, little saving on the storage space or the bandwidth occupied by such images in the transmission thereof is gained. Even where compression ratios are reasonable, such image compression systems tend to be relatively complex, complicated and time-consuming, and also may require large storage space to effect the compression. Typical image compression systems are described in U.S. Pat. No. 4,809,350, European Patent Specification No. 0,479,563 and European Patent Specification No. 0,536,801. The image compression methods described in these three specifications suffer from one or more of the disadvantages discussed above.

There is therefore a need for a method for compressing digital image data which overcomes the problems of known digital image data systems and which provides lossless or effectively lossless compression, while at the same time providing reasonable compression.

The present invention is directed towards providing such a method and apparatus for compressing digital image data.

The term "region" as used throughout this specification and the claims means one pixel or a group of adjacent pixels.

According to the invention, there is provided a method for compressing digital image data, the method comprising the steps of sequentially scanning a plurality of regions of the image data and determining the actual value of the data in respective regions, predicting the value of image data in at least some of the regions based on the determined actual values of some of the already scanned regions which are adjacent the region for which the image data is being predicted, comparing the predicted value with the corresponding actual value of each region for which a prediction is made, and computing the value of the difference between the respective predicted values and the corresponding actual values, and compressing the respective difference values, characterised in that at least three predictions of data value are made for each region for which a prediction is being made, the predicted value which produces the median difference value of the difference values between the respective three predicted values and the actual value is selected, and the median difference value is compressed for each region for which a prediction is made, the respective predicted values for each region being based on the actual value or values of a different scanned region or regions and/or a different combination or combinations of scanned regions to those for which the others of the predictions for that region are based.

In one aspect of the invention, the digital image data is scanned region by region as a matrix array of regions.

In another aspect of the invention, one of the predictions of data value of a region for which a prediction is being made is based on the data value of the adjacent region in the column in which the region for which the prediction is being made lies.

In another aspect of the invention, one of the predictions of data value of a region for which a prediction is being made is based on the data value of the adjacent region in the row in which the region for which the prediction is being made lies.

Preferably, one of the predictions of data value of a region for which a prediction is being made is based on the gradient of data values of two regions approaching the region for which the prediction is being made. Advantageously, the prediction of the data value takes into account the slope of the gradient.

In one aspect of the invention, one of the two regions on which a prediction is based lies closer to the region for which the prediction is being made than the other of the said two regions, and the region of the said two regions which is closest to the region for which the prediction is being made is weighted.

In another aspect of the invention, one of the predictions of data value of a region for which a prediction is being made is based on the data values of three regions which are adjacent to the region for which the prediction is being made, one of the said regions lying in the same column, and the other of said regions lying in the same row as the region for which the prediction is being made, the third region being located between the said other two regions and being used for determining the gradient of the data values between the respective said other two regions and the region for which the prediction is being made.

Preferably, a prediction of the data value of every region of the digital image is made.

In one aspect of the invention, the respective median difference values are compressed by encoding the median difference values with respective variable length codes, unique codes being assigned to the respective median difference values.

Preferably, the shortest code is assigned to the most frequently occurring median difference value, and the longest code is assigned to the least frequently occurring median difference value.

Advantageously, the codes are different for the positive and negative values of the same absolute median difference values.

In one aspect of the invention, the codes assigned to the median difference values are binary codes.

Advantageously, the bit length of the longest code for the median difference values does not exceed the bit length of the data value of any region.

In one aspect of the invention, the actual data of a region is retained instead of the median difference value for that region should the median difference value for that region exceed a predetermined value. Preferably, a first flag means is set to indicate that the data following the flag means is the actual data value of the region.

In another aspect of the invention, a second flag means is set to indicate a run of actual data values where the median difference values of a run of regions exceeds a predetermined value. Preferably, the number of actual data values included in the run is associated with the second flag means. Advantageously, the second flag means is provided before the run of actual data values.

Ideally, the coded median difference values and the actual data values for the respective regions are stored in a predetermined format for subsequent retrieval and decompression.

In general, the most frequently occurring median difference value is zero.

In another aspect of the invention, noise is separated from the digital image data by separating at least the least significant bit from the value of the data in the respective regions in which a prediction of the data value is to be made, and from the adjacent regions on which the predictions are to be based prior to the prediction being made, and the separated least significant bits are stored in association with the corresponding compressed median difference values of the respective regions. Preferably, the data values remaining of the respective regions from which one or more least significant bits have been separated is divided by $2^n$ where n is equal to the number of least significant bits separated.

Preferably, at least some of the digital image data is scanned prior to the separation of noise for determining the number of least significant bits to be separated.

In a further aspect of the invention, the digital image data is modified prior to computing the predicted data values for reducing the numerical difference between the data values occurring in the digital image data, the digital image data being modified by arranging all the determined actual data values occurring in the image data in the form of a series of actual data values in ascending order of data values, assigning each actual data value occurring in the image a modified data value so that the numerical difference between adjacent modified data values is less than the numerical difference between the respective adjacent actual data values in the series, the modified data values forming the data values on which the predictions are based. Preferably, the modified data values are assigned so that the difference between modified data values which correspond to adjacent data values in the series of data values is unity. Advantageously, the modified data values and the actual data values are cross-referenced in a look-up table. Ideally, an inverse look-up table based on the modified and the actual data values is prepared for use in subsequent reconstruction of the image.

Preferably, each look-up table is stored with the stored compressed median difference values.

In one aspect of the invention, a histogram of the actual data values occurring in the digital image data is formed for preparing each look-up table.

In one aspect of the invention, the data value of each region defines a value of greyscale between and including black and white.

In another aspect of the invention, the data value of each region defines a value of intensity of a colour in a colour image.

Ideally, the compressed data values of the digital image are stored in a predetermined format for retrieval thereof for subsequent decompression.

Ideally, each region defines a pixel. In one aspect of the invention, the digital image is in raster format.

In another aspect of the invention, the method is carried out on an acquired image after the image has been acquired.

In a further aspect of the invention, the method is carried out on an acquired image while the image is being acquired "on-the-fly".

In a still further aspect of the invention, the method is carried out on the acquired image with intermediate storage or in parallel with intermediate storage.

The image in compressed form is suitable for storing and/or transmission.

In another aspect of the invention, the method is used for compressing a three dimensional image, and one of the axes of the three dimensional image is time, the time axis forming a row or column of the matrix, and that row or column forming the row or column as the case may be in which a region or regions are located which form a basis for predicting a data value of a region.

In another aspect of the invention, the method further comprises the step of decompressing the compressed digital image data, the decompression method comprising the steps in reverse order to the order of the steps of the compression method.

Additionally, the invention provides a method for compressing digital image data, the method comprising the steps of sequentially scanning a plurality of regions of the image data and determining the actual value of the data in respective regions, predicting the value of image data in at least some of the regions based on the determined actual values of some of the already scanned regions which are adjacent the region for which the image data is being predicted, comparing the predicted value with the corresponding actual value of each region for which a predicted value is made, and computing the value of the difference between the respective predicted values and the corresponding actual values, and compressing the respective difference values, characterised in that the respective difference values are compressed by encoding the difference values with respective variable length codes, unique codes being assigned to the respective difference values.

Preferably, the shortest code is assigned to the most frequently occurring difference value, and the longest code is assigned to the least frequently occurring difference value.

In general, the most frequently occurring difference value is zero.

In a further aspect of the invention, the codes are different for the positive and negative values of the same absolute difference values.

The codes assigned to the difference values are binary codes.

Ideally, the bit length of the longest code does not exceed the bit length of the data value of any region.

In one aspect of the invention, the actual value of a region is retained instead of the difference value for that region should the difference value for that region exceed a predetermined value. Preferably, a first flag means is set to indicate that the data following the flag means is the actual data value of the region.

In another aspect of the invention, a second flag means is set to indicate a run of actual data values where the difference values of a run of regions exceeds a predetermined value. Preferably, the number of actual data values included in the run is associated with the second flag means. Advantageously, the second flag means is provided before the run of actual determined data values.

Ideally, the coded difference values and the actual data values for the respective regions are stored in a predetermined format for subsequent retrieval and decompression.

Further, the invention provides a method for compressing digital image data, the method comprising the steps of sequentially scanning a plurality of regions of the image data and determining the actual value of the data in respective regions, predicting the value of image data in at least some of the regions based on the determined actual values of some of the already scanned regions which are adjacent the region for which the image data is being predicted, comparing the predicted value with the corresponding actual value of each region for which a predicted value is made, and computing the value of the difference between the respective predicted values and the corresponding actual values, and compressing the respective difference values, characterised in that noise is separated from the digital image data by separating at least the least significant bit from the value of the data in the respective regions in which a prediction of the data value is to be made and from the adjacent regions on which the predictions are to be based prior to the prediction being made, and the separated least significant bits are stored in association with the corresponding compressed difference values of the respective regions.

Preferably, the data values remaining of the respective regions from which one or more least significant bits have been separated is divided by $2^n$ where n is equal to the number of least significant bits separated.

Preferably, at least some of the digital image data is scanned prior to the separation of noise for determining the number of least significant bits to be separated.

Additionally, the invention provides a method for compressing digital image data, the method comprising the steps of sequentially scanning a plurality of regions of the image data and determining the actual value of the data in respective regions, predicting the value of image data in at least some of the regions based on the determined actual values of some of the already scanned regions which are adjacent the region for which the image data is being predicted, comparing the predicted value with the corresponding actual value of each region for which a predicted value is made, and computing the value of the difference between the respective predicted values and the corresponding actual values, and compressing the respective difference values, characterised in that the digital image data is modified prior to computing the predicted data values for reducing the numerical differences between the data values occurring in the digital image data, the digital image data being modified by arranging all the determined actual data values occurring in the image data in the form of a series of actual data values in ascending order of data values, assigning each actual data value occurring in the image a modified data value so that the numerical difference between adjacent modified data values is less than the numerical difference between the respective adjacent actual data values in the series, the modified data values forming the data values on which the predictions are based.

Preferably, the modified data values are assigned so that the difference between modified data values which correspond to adjacent data values in the series of data values is unity.

Preferably, the modified data values and the actual data values are cross-referenced in a look-up table. Advantageously, an inverse look-up table based on the modified and the actual data values is prepared for subsequent reconstruction of the image.

Ideally, each look-up table is stored with the stored compressed difference values.

In one aspect of the invention, a histogram of the actual data values occurring in the digital image data is formed for preparing the look-up tables.

Further, the invention provides apparatus for compressing digital image data, the apparatus comprising a means for sequentially scanning a plurality of regions of the image data and for determining the actual value of the data in respective regions, a means for predicting the value of image data in at least some of the regions based on the determined actual values of some of the already scanned regions which are adjacent the region for which the image data is being predicted, a means for comparing the predicted value with the corresponding actual value of each region for which a prediction is made, and a means for computing the value of the difference between the respective predicted values and the corresponding actual values, and a means for compressing the respective difference values, characterised in that the means for predicting the value of image data comprises a means for making at least three predictions of data value for each region for which a prediction is being made, a selecting means is provided for selecting the predicted data value which produces the median difference value of the difference values between the predicted data values and the actual value, and the means for compressing the respective difference values compresses the median difference values for the regions for which a prediction is made, the means for making the at least three predictions makes the respective predictions for each region based on the actual value or values of a different scanned region or regions and/or a different combination or combinations of scanned regions to those for which the others of the predictions for that region are based.

Additionally, the invention provides apparatus for compressing digital image data, the apparatus comprising the steps of a means for sequentially scanning a plurality of regions of the image data and for determining the actual value of the data in respective regions, a means for predicting the value of image data in at least some of the regions based on the determined actual values of some of the already scanned regions which are adjacent the region for which the image data is being predicted, a means for comparing the predicted value with the corresponding actual value of each region for which a prediction is made, and a means for computing the value of the difference between the respective predicted values and the corresponding actual values, and a means for compressing the respective difference values, characterised in that the means for compressing the respective difference values comprises a means for encoding the difference values with respective variable length codes, a unique code being assigned to each value of difference value.

Further, the invention provides apparatus for compressing digital image data, the apparatus comprising the steps of a means for sequentially scanning a plurality of regions of the image data and for determining the. actual value of the data in respective regions, a means for predicting the value of image data in at least some of the regions based on the determined actual values of some of the already scanned regions which are adjacent the region for which the image data is being predicted, a means for comparing the predicted value with the corresponding actual value of each region for which a prediction is made, and a means for computing the value of the difference between the respective predicted values and the corresponding actual values, and a means for compressing the respective difference values, characterised in that a means for separating noise from the digital image data is provided, the separating means separating at least the least significant bit from the value of the data in the respective regions in which a prediction of the data value is to be made, and from the adjacent regions on which the predictions are to be based prior to the prediction being made, and a means for storing the separated least significant bits in association with the corresponding difference values of the respective regions.

The invention also provides apparatus for compressing digital image data, the apparatus comprising the steps of a means for sequentially scanning a plurality of regions of the image data and for determining the actual value of the data in respective regions, a means for predicting the value of image data in at least some of the regions based on the determined actual values of some of the already scanned regions which are adjacent the region for which the image data is being predicted, a means for comparing the predicted value with the corresponding actual value of each region for which a prediction is made, and a means for computing the value of the difference between the respective predicted values and the corresponding actual values, and a means for compressing the respective difference values, characterised in that a means is provided for modifying the digital image data prior to computing the predicted data values for reducing the numerical difference between the data values occurring in the digital image data, the said means comprising a means for arranging all the determined actual data values occurring in the image data in the form of a series of actual data values in ascending order of data values, and a means for assigning each actual data value occurring in the image a modified data value so that the numerical difference between adjacent modified data values is less than the numerical difference between the respective adjacent actual data values in the series, the modified data values forming the data values on which the predictions are based.

Figure 4:
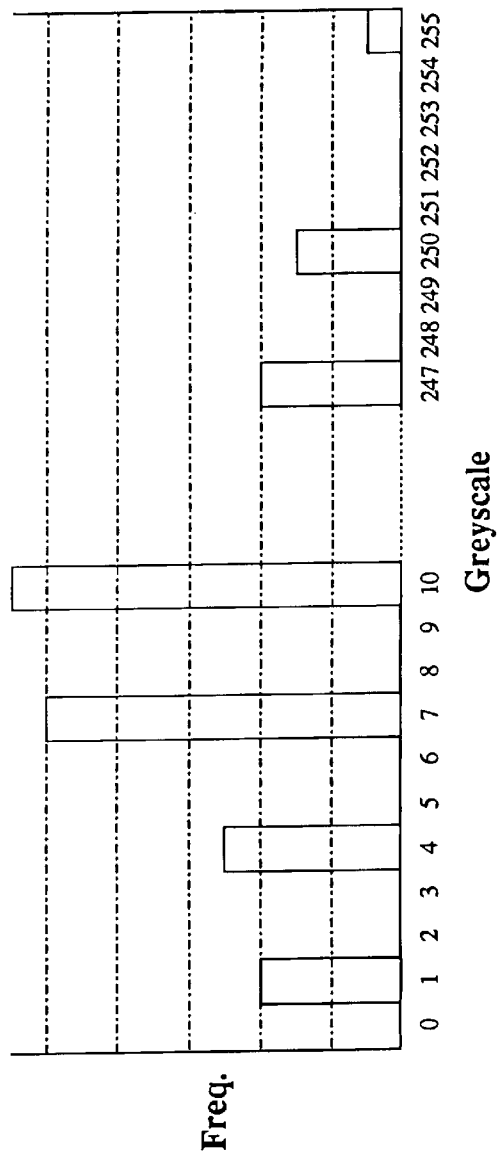
Figure 15:
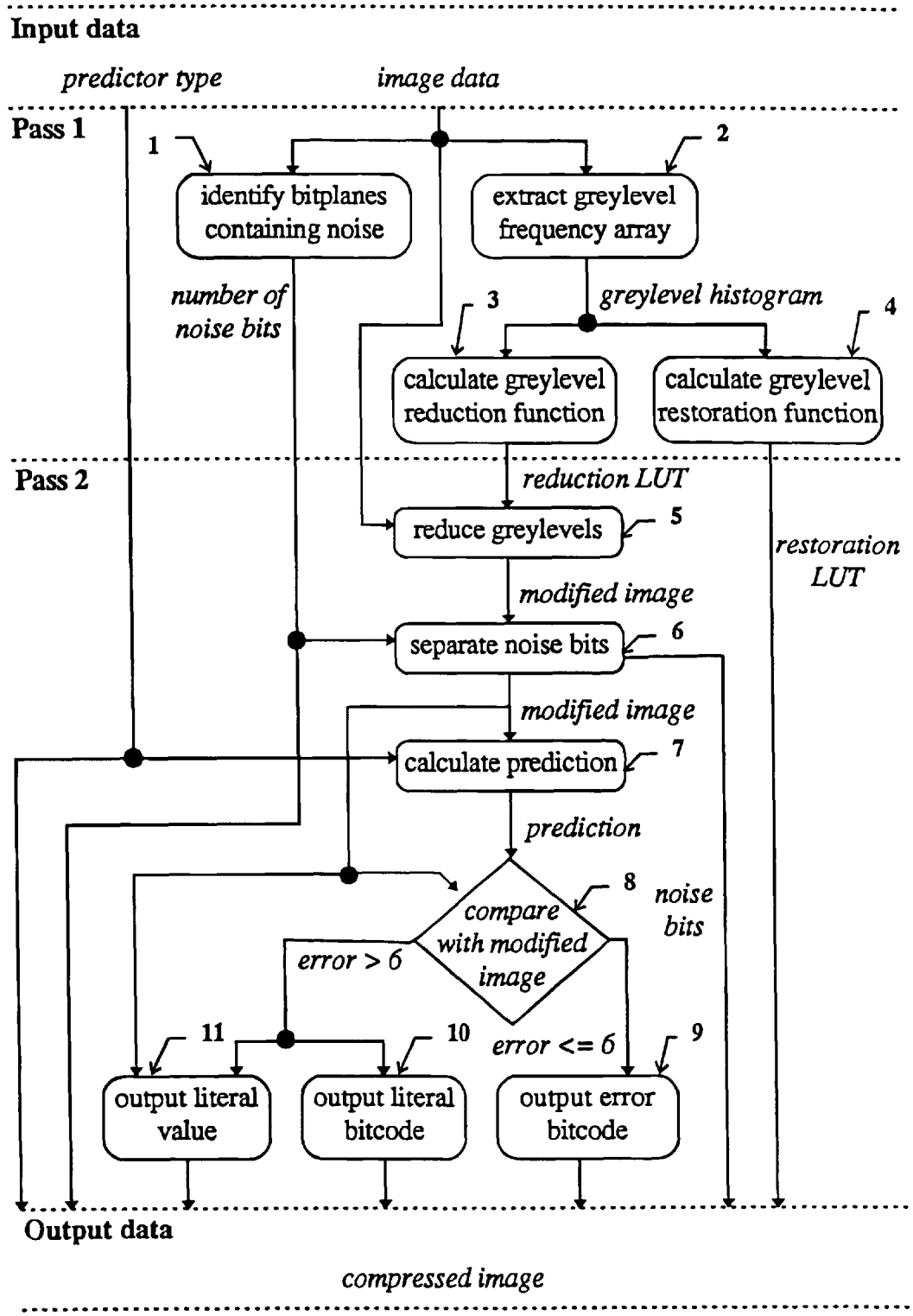

The invention will be more clearly understood from the following description of an embodiment thereof which is given by way of example only, with reference to the accompanying drawings, in which:

FIG. 1 is a diagrammatic representation of a digital X-ray image to which a method for compressing digital image data according to the invention is to be applied, FIG. 2 is a flowchart of the method according to the invention for compressing the digital image data, FIG. 3 is a flowchart of a method also according to the invention for decompressing the compressed digital image data, FIG. 4 is portion of a histogram showing the frequency of the occurrence of greyscale values in the image of FIG. 1 which has been contrast stretched, FIG. 5(a) is a numerical representation of the histogram of FIG. 4, FIG. 5(b) is a look-up table for modifying the image from which the histogram of FIG. 4 has been prepared so that the differences between greyscale values occurring in the image is unity, FIG. 5(c) is an inverse look-up table, which is the inverse of the look-up table of FIG. 5(b) for use in restoring the image during decompression, FIG. 6(a) is an enlarged view of a portion of the image of FIG. 1 showing greyscale values of some of the pixels, FIG. 6(b) shows the value of the least significant noise bits which have been separated from the pixels of FIG. 6(a), FIG. 6(c) shows the remaining data value of the pixels of FIG. 6(a) after the least significant noise bits have been separated from the pixels, FIGS. 7(a) to (c) show algorithms according to the method of the invention for making three predictions of greyscale value of each of the pixels of the image of FIG. 1, FIG. 7(d) illustrates diagrammatically how the three methods of prediction of FIGS. 7(a) to 7(c) are used in determining a median difference value for each pixel, FIGS. 7(e) and (f) show algorithms and illustrate diagrammatically alternative prediction methods also according to the invention which include five predictions of greyscale value of each pixel for enabling a median difference value to be selected, FIGS. 8(a) to (d) illustrate mathematically how median difference values are selected for ten pixels in the digital image of FIG. 1, FIG. 9 illustrates a look-up table for encoding median difference values, FIG. 10 is a distribution graph illustrating the distribution of the median difference values of the image of FIG. 1, FIG. 11 shows the values of some of the pixels of FIG. 6 after the image of FIG. 1 has been modified to reduce the differences between greyscale values occurring in the image to unity, the value of the noise bits separated from the modified values of the pixels, and the encoded median difference values of the pixels, FIG. 12 illustrates a bit packed binary string of the pixels of FIG. 11, FIGS. 13 and 14 illustrate a computer programme in pseudo-code according to the invention for compression of the image of FIG. 1, and FIG. 15 illustrates a flow diagram of the computer programme of FIGS. 13 and 14 for compression of the image of FIG. 1.

Referring to the drawings, a method for compressing digital image data, typically, a digital image of an X-ray 1 will now be described. The digital X-ray image is acquired in raster format, see FIG. 1, having a plurality of rows 4 of regions, which in this case are pixels 5 which are formed in a matrix of the rows 4 and columns 6. Each pixel 5 defines the level of greyscale at the location of the image corresponding to the pixel by an eight bit binary code. Although for convenience of illustration, the image 1 is illustrated in FIG. 1 as having twelve rows 4 and sixteen columns 6 of pixels 5, it will be appreciated by those skilled in the art that, in general, such an image would have a significantly larger number of pixels 5 per row and per column. In general, the number of pixels per row and column can vary from 64 pixels per row by 64 pixels per column to 5,000 pixels per row by 4,000 pixels per column. The method according to the invention is suitable for dealing with an image with any number of pixels per row and per column. Additionally, while in the embodiment of the invention described with reference to the drawings, the level of greyscale of each pixel is defined by an eight bit binary code, it will be appreciated that the level of greyscale may be defined by smaller or larger bit codes, indeed, in general, in X-ray imagery the greyscale level per pixel is defined by ten or twelve bit binary codes. The method according to the invention may be used for compressing any digital image irrespective of the size of the bit code for defining greyscale values. The method according to the invention for compressing the digital image comprises the following steps which are set out in the flowchart of FIG. 2. In Step 1, the original X-ray image is acquired and scanned for determining the actual greyscale value of each pixel. Step 2 then checks if there are gaps in greyscale values occurring in the acquired image. In other words, Step 2 checks if greyscale values are missing from the acquired image. If so, Step 2 modifies the acquired image for reducing the numerical differences between greyscale values occurring in the image to unity. Step 2 is only carried out where there are gaps in greyscale values occurring in the acquired image. Such gaps in greyscale values could have been caused if the image had already been modified, for example, by contrast stretching. In such cases, many values of greyscale would be missing from the image, and such gaps in the greyscale values would prevent subsequent steps of the method being carried out effectively, as will be described below.

Step 3 checks for noise in the acquired image. If noise is present, the noise is separated from each pixel, and this is achieved by separating the least significant bit or bits from the greyscale values of the pixels. The separated noise bits are stored uncompressed as will be described below in association with the compressed data so that they can be replaced during decompression of the image.

In Step 4 the greyscale value of each pixel is predicted, the prediction being based on the determined actual greyscale values of its adjacent pixels as will be described in detail below. In this embodiment of the invention, three predictions of greyscale values are made for each pixel. The three predicted greyscale values of each pixel are then compared with the actual value of the pixel and the values of the differences between the predicted values and the actual value are computed. The median difference value of the three difference values is selected.

In Step 5 the median difference values for the pixels are coded using variable length codes as will be described below.

In Step 6, the coded median difference values for the pixels are packed, and the separated noise bits, if noise bits were originally separated, are also packed associated with the coded median difference values for the corresponding pixels.

In Step 7, further compression of the packed bits may be carried out using any suitable known lossless data compression method, such as LZW. Such general lossless data compression methods will be well known to those skilled in the art. The compressed image is then outputted to storage or transmitted as desired.

FIG. 3 illustrates a flowchart for decompression of the compressed image which comprises Steps 9 to 16, which as can be seen are effectively the reverse of Steps 1 to 8 of the compression flowchart of FIG. 2. The flowchart of FIG. 3 will be briefly described below.

For convenience, each of the Steps 1 to 8 will be described separately below under separate headings.

Input Original Image

As the original digital image of the X-ray is being acquired, it is scanned. Because each pixel defines the level of greyscale which the pixel represents in eight bit binary form, 256 levels of greyscale are available, and because the image is an X-ray image, in general, all 256 levels of greyscale will be present in the image if the image has not been altered, for example, by contrast stretching or the like. On being scanned, should it be determined that all or substantially all levels of greyscale are to be found in the image, Step 2, namely, the modification of the image for reducing the numerical differences between greyscale values to unity is not required, and is omitted. However, where large gaps occur in the greyscale values found in the image, the method of Step 2 is applied to the image as will. now be described.

Modification of the Image to Reduce Greyscale Gaps

Figure 5:
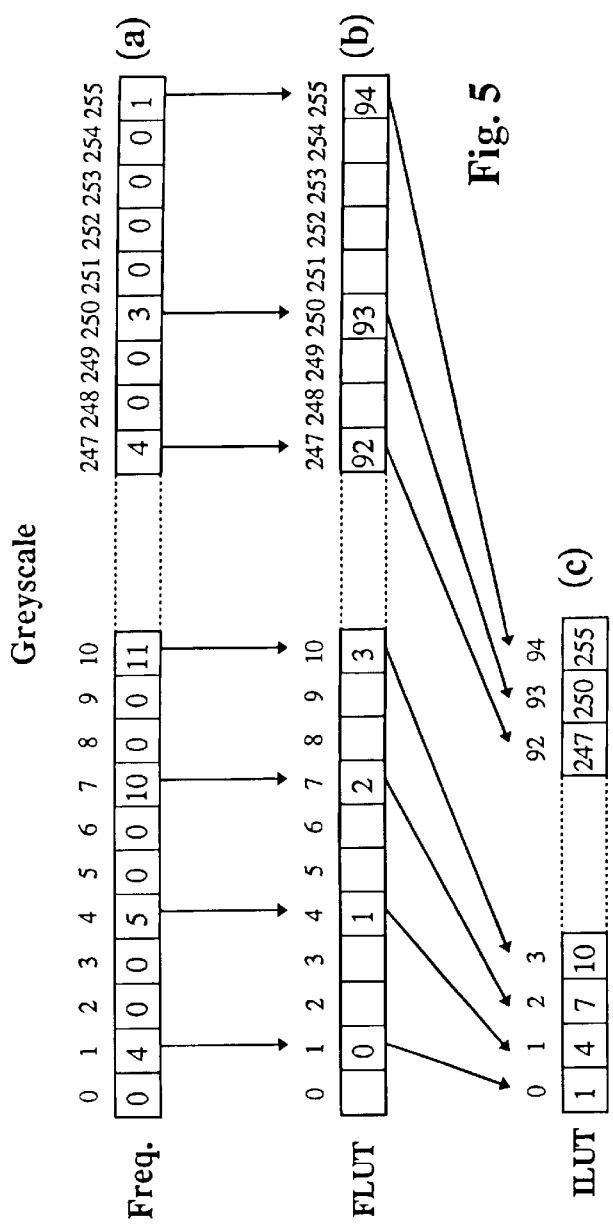

Referring now to FIGS. 4 and 5, Step 2 for reducing the numerical differences between the greyscale values occurring in the image will now be described. A histogram of the frequency of greyscale values occurring in the image is constructed. A typical histogram is illustrated graphically in FIG. 4, however, in practice the method will be carried out by a computer programme and the histogram will be prepared in the form of FIG. 5(a). As can be seen from FIGS. 4 and 5, none of the pixels in the image contain a greyscale value of 0. Four of the pixels contain a greyscale value of 1. There are no pixels with greyscale values of 2 and 3, and there are five pixels of greyscale value of 4. No pixels have a greyscale value of 5 and 6, but ten pixels have a greyscale value of 7. None of the pixels have a greyscale value of 8 or 9 and eleven have a greyscale value of 10. For convenience, the entire image will not be considered here, however, towards the top end of greyscale values, four pixels have a greyscale value of 247, none have greyscale values of 248 and 249, and three have a greyscale value of 250, while none have greyscale values of 251 to 254. One pixel has a greyscale value of 255. In FIG. 5(a) the greyscale values are shown above the boxes and the frequency of occurrence of the greyscale values are shown by the numbers in the boxes. In order to reduce the differences between the greyscale values occurring in the image to unity, the look-up table of FIG. 5(b) is prepared. The greyscale value of 1 is assigned the greyscale value of 0 for the reduced modified image. The greyscale value of 4 is assigned the greyscale value of 1 for the reduced modified image, the greyscale value of 7 is assigned the value 2 for the reduced modified image, the greyscale value of 10 is assigned the greyscale value of 3 for the reduced modified image, and so on up to the greyscale value of 247 which is assigned the value of 92 for the reduced modified image, and so on up to the greyscale value of 255, which is assigned the value of 94 for the reduced modified image. The greyscale values of 4 to 91 are also all used in the reduced modified image. Accordingly, in the reduced modified image to which the remaining steps of the method will be applied, the differences between the greyscale values occurring in the image is unity. FIG. 5(c) illustrates an inverse look-up table for reproducing the original image during decompression as will briefly be described below.

In preparing of the modified image the greyscale values of the pixels from 0 to 94 are assigned to the pixels of the acquired image in accordance with the look-up table of FIG. 5(b). The reduced modified image is then subjected to Step 3, as will now be described.

Noise Separation

In Step 3, the acquired image, or if the image has been subjected to Step 2 the reduced modified image is scanned to ascertain the level of noise. Any suitable method may be used, for example, the number of noise planes may be calculated using bit plane entropy statistics, which will be known to those skilled in the art. This will determine the number of least significant bits to be separated from each pixel to reduce noise to an optimum level. This method will also determine if there is insufficient noise to justify separation, and if so, the image is passed to Step 4. Where noise is present, typically, one to three least significant bits will be separated. In this embodiment of the invention, the two least significant bits are separated from the value of each pixel and stored. Each pixel is then divided by four, namely, $2^n$ where n is the number of least significant bits which have been separated, namely, in this case, two. This maintains the difference between the greyscale values occurring in the image or the reduced modified image at unity. The two least significant bits which have been separated from each pixel are stored in pixel order for subsequent bit packing which will be described below. After the step of noise reduction, the digital image is then subjected to Step 4.

Prediction of Greyscale Value

Referring now to FIGS. 6 to 8, Step 4, the step of predicting the greyscale value in each pixel of the image will now be described. The image which is subjected to Step 4 may be the acquired image if the image has not been subjected to modification under Step 2 and noise separation under Step 3. Alternatively, the image which is subject to Step 4 may be a modified image which may or may not have been subjected to noise separation, or the acquired image which may or may not have been subjected to noise separation. In this embodiment of the invention, the image has been modified and also subjected to noise separation.

Referring initially to FIG. FIG. 6(a) illustrates a portion of the matrix of pixels 5, and pixel values are shown in some of the pixels 5. These are the actual pixel values of the acquired image as it was acquired. FIG. 6(b) shows the modified values of the pixels from pixel $P_{[i-1,j-1]}$ to pixel $P_{[i,j+9]}$ after the image had been modified under Step 2. FIG. 6(c) shows pixel values for the same pixels as in FIG. 6(b) after the image has been subjected to Step 3, namely noise reduction. It is the pixel values of FIG. 6(c) which are the actual values of the pixels which are used as a basis for making the three predicted values of the respective pixels.

For the purpose of describing the method, the greyscale value of pixel $P_{[i,j]}$ will be described. The pixel value of pixel $P_{[i,j]}$ is predicted based on the actual values of the following pixels:

$$P_{[i,j-1]}, P_{[i-1,j]} \text{ and } P_{[i-1,j-1]}$$

The three predictions of the value of pixel $P_{[i,j]}$ are made and the differences between each predicted value and the actual value of the pixel $P_{[i,j]}$ from FIG. 6(c) are computed.

A first prediction of the value of the pixel $P_{[i,j]}$ is made based on the actual value shown in FIG. 6(c) of the pixel $P_{[i,j-1]}$ where the first predicted value of $P_{[i,j]}$ is $$\hat{P}1_{[i,j]} = P_{[i,j-1]},$$

see FIG. 7(a).

Since the value of the pixel $P_{[i,j-1]}$ is equal to 6, the first predicted value $$\hat{P}1_{[i,j]} = 6.$$

A second prediction of the value of the pixel $P_{[i,j]}$ is based on the value shown in FIG. 6(c) of the pixel $P_{[i-1,j]}$ and is determined by the formula $$\hat{P}2_{[i,j]} = P_{[i-1,j]},$$

see FIG. 7(b).

Since the value of the pixel $P_{[i-1,j]}$ is 11, the second predicted value $$\hat{P}2_{[i,j]} = 11.$$

A third prediction of the value of the pixel $P_{[i,j]}$ is made based on the values shown in FIG. 6(c) of the pixels $P_{[i,j-1]}$, $P_{[i-j]}$ and the gradient of the pixel values in rows i–1 between the pixels $P_{[i-1,j-1]}$ and $P_{[i-1,j]}$, and the gradient of the pixel values in column j–1 between the pixels $P_{[i-1,j-1]}$ and $P_{[i,j-1]}$. This is obtained from the formula $$\hat{P}3_{[i,j]} = P_{[i,j-1]} + (P_{[i-1,j]} - P_{[i-1,j-1]}),$$

see FIG. 7(c), where $\hat{P}3_{[i,j]}$ is the third predicted value.

The value of the pixel $P_{[i-1,j-1]}$ is 8 and since the values of the pixels $P_{[i,j-1]}$ and $P_{[i-1,j]}$ are 6 and 11, respectively, the third predicted value $\hat{P}3_{[i,j]}$ from the formula of FIG. 7(c) is 9.

The three predicted values $\hat{P}1_{[i,j]}$, $\hat{P}2_{[i,j]}$ and $\hat{P}3_{[i,j]}$ and the actual value of the pixel $P_{[i,j]}$ are compared and the respective differences values between the predicted values and the actual value are computed. The difference values between the three predicted values and the actual value of pixel $P_{[i,j]}$ are shown in FIGS. 8(a) to (c). The difference value between the first predicted value and the actual value is +4, the difference value between the second predicted value and the actual value is −1, and the difference value between the third predicted value and the actual value is +1. In accordance with the method of the invention, the median difference value is selected, which in this case is +1, see FIG. 8(d). The median difference value is then coded as will be described below in accordance with Step 5. Also in FIGS. 8(a), (b) and (c), the difference values between the first, second and third predicted values P̂1, P̂2 and P̂3, and the actual values of the pixels $P_{[i,j+1]}$ to $P_{[i,j+9]}$ are also shown. The median difference values for the pixels $P_{[i,j+1]}$ to $P_{[i,j+9]}$ are shown in FIG. 8(d). The first, second and third predicted values, P̂1, P̂2 and 3̂, respectively, are determined in the same manner as described above for determining the first, second and third predicted values $P̂1_{[i,j]}$, $P̂2_{[i,j]}$ and $P̂3_{[i,j]}$, respectively, and the respective difference values and the median values are likewise computed in similar fashion as the difference values and median difference value for the pixel $P_{[i,j]}$.

After each median difference value has been computed, the median difference value is encoded in accordance with Step 5 which will now be described.

Difference Coding

Referring now to FIGS. 9 and 10, the bit codes which are of variable length for coding the median difference values are illustrated in the look-up table of FIG. 9. The median difference value of 0 is the most frequently occurring median difference value, and thus the shortest bit code, namely, the one bit code " " is assigned to this. The median difference values of ±1 are the next most frequently occurring median difference values and the next shortest bit codes which are three bit codes are assigned to these, and so on up to the median difference values of ±6, to which eight bit codes are assigned. FIG. 10 illustrates the distribution of the median difference values for the X-ray image of FIG. 1. Each code of FIG. 9 is a unique code, and when read from the right-hand side to the left-hand side can be instantly identified as being a bit code for coding the median difference values, the significance of this is that there is no need to indicate the beginning and end of the bit codes for the median difference values when the bit codes fare being bit packed as will be described below in relation to Step 6.

As discussed above, the bit codes for the difference values −6 and +6 are eight bit codes. Since the value of each pixel is provided in an eight bit code, there is no advantage in coding difference values over −6 or +6, since the bit code would be longer than the actual bit code of the pixel. In such cases, where the median difference value exceeds +6 or −6, the actual value of the pixel is stored and bit packed, see Step 6 below. A first flag means is provided for flagging when an actual value of a pixel is being bit packed, and in this case, the first flag means is an eight bit code which is shown in the look-up table of FIG. 9 against the abbreviation "Lit 1". The actual value referred to here is the value of the pixel after modification of the image under Step 2 and noise reduction under Step 3. Where a run of pixels is encountered where the median difference values in each case exceeds ±6, the actual values of the pixels in the run are bit packed. A second flag means for indicating that a run of actual values of pixels is being bit packed is provided by an eight bit code which is shown in the look-up table of FIG. 9 against the abbreviation "Lit N". After the eight bit code of the second flag the number of pixels in the run is provided in a four bit code, and then the eight bit values of the respective pixels in the run are bit packed, as will be described below. After the median difference value of each pixel has been coded or its actual value retained, the coded value or actual value is bit packed in a bit string in accordance with Step 6 which will now be described.

Bit Packing

The bit packing of the coded median difference values, the actual values of the pixels where appropriate and the sepa-rated least significant noise bits will now be described with reference to FIGS. 11 and 12. FIG. 11 illustrates the median difference values for the string of pixels $P_{[i,j]}$ to $P_{[i,j+9]}$. The median difference values of three of the pixels exceeded ±6, and thus the actual values of those pixels are retained. FIG. 11 also shows the actual modified values of the pixels $P_{[i,j]}$ to $P_{[i,j+9]}$, as well as the values of the noise components, namely, the values of the two least significant noise bits separated from the pixels $P_{[i,j]}$ to $P_{[i,j+9]}$. FIG. 12 shows the bits of pixels $P_{[i,j]}$ to $P_{[i,j+9]}$ bit packed into a string of bits. The median difference value of pixel $P_{[i,j]}$ is +1, and the difference value code from the look-up table of FIG. 9 is 101. The noise bits which had been separated from the pixel value are combined with the difference value code and included in the string. In this case, the noise bits which had been separated under Step 3 are the bits 01. For convenience and for ease of understanding FIG. 12, the least significant bits which have been included along with the median difference value codes and actual values are underlined. The bits for each pixel of FIG. 12 are combined and illustrated in boxes. The value of the median difference value code or the actual value of the pixel which is bit packed for each of the pixels is shown above the relevant box. The median difference value of pixel $P_{[i,j+1]}$ is also +1, and thus the median difference value code is 101. The separated noise bits of 10 are combined with the median difference value code 101. In the case of pixel $P_{[i,j+2]}$ the median difference value is −2, and thus the median difference value code is 1100. The two least significant noise bits 11 which had been separated from pixel $P_{[i,j+2]}$ are combined with the median difference value code. The median difference values of pixels $P_{[i,j+3]}$ and $P_{[i,j+4]}$ being greater than ±6, the actual values of 26 and 34, respectively, of these two pixels are included in the bit string. However, to indicate that the actual values of the two pixels $P_{[i,j+3]}$ and $P_{[i,j+4]}$ are being included in the bit string, the second flag "Lit 2" is included in the bit string preceding the actual values of these two pixels, and the second flag "Lit 2" is followed by the four bit code indicating that the next two values following the-second-flag "Lit 2" are actual values. Since no noise bits were separated from the pixel $P_{[i,j+3]}$, the two bits 00 are combined with the actual value of the pixel $P_{[i,j+3]}$. The noise bits which were separated from the pixel $P_{[i,j+4]}$ of 01 are combined with the actual value of the pixel in the bit string. The median difference value code is bit packed for the pixels $P_{[i,j+6]}$ and $P_{[i,j+7]}$. Since the median difference value of the pixel $P_{[i,j+8]}$ exceeds ±6, the actual value is bit packed along with the noise bits which had been separated. In the case of the pixel $P_{[i,j+9]}$ the median difference value code is bit packed along with the noise bits which had been separated.

After bit packing, the compression of the image according to the invention has been completed. The compressed bit packed image may then be subjected to further well-known compression techniques, for example, LZW compression if desired. The bit packed image or the compressed bit packed image is then outputted along with relevant header information which is required for decompression, and the compressed bit packed image and the header information may be stored or transmitted. The header information contains details of the image width, the height and the number of bits per pixel, in other words, the number of bits used for giving the greyscale value of each pixel in the originally acquired image. The header information also includes an indication as to whether or not the image was modified to reduce the gaps between the greyscale values occurring in the original image, and if so, the header information also includes the inverse look-up table. The header information includes the number of least significant bits which were separated in the compression method for optimising noise reduction. The header information also includes the algorithms used for predicting the levels of greyscale of each pixel.

Turning now to FIG. 3, the steps of decompression will briefly be described. Under Step 9, the compressed image from Step 8 is acquired. Step 10 decompresses the bit packed image if the bit packed image had been subjected to LZW compression or other well-known compression, using the appropriate decompression algorithm. Step 10 is omitted if the image acquired by Step 9 had not been subjected to Step 7. Step 11 then unpacks the bits and separates the least significant bits from the coded median difference values or the actual values of the pixels as the case may be. The image from Step 11 is then subjected to Step 12 which using similar algorithms to those described with reference to Step 4 predicts the values of the pixels and determines the median difference values. In Step 13, the median difference values are then decoded using the table of FIG. 9 in reverse, and the image is subjected to Step 14 which returns the noise to the pixel values determined from Step 13. If the image was subjected to reduction modification of Step 2, the image is subjected to Step 15 which by the use of the inverse look-up table of FIG. 5(c) reverses Step 2 of the compression method, and then Step 16 outputs a restored image which is identical to the original image acquired in Step 1.

Returning now to FIGS. 7(e) and 7(f) two alternative prediction methods for predicting the value of pixel $P_{[i,j]}$ are illustrated. In each of these prediction methods, two further additional predictions of the pixel values of pixel $P_{[i,j]}$ are carried out as well as the first three predictions, $\hat{P}1_{[i,j]}$, $\hat{P}2_{[i,j]}$ and $\hat{P}3_{[i,j]}$ already described. In the case of the method of FIG. 7(e), a fourth prediction $\hat{P}4_{[i,j]}$ of the pixel value of pixel $P_{[i,j]}$ is carried out based on the previous two pixels in the row i, namely, pixel $P_{[i,j-1]}$ and pixel $P_{[i,j-2]}$ from the formula $$\hat{P}4_{[i,j]} = 2 \times P_{[i,j-1]} - P_{[i,j-2]}$$

Since the pixel P[i,j 31 1] is closer to the pixel $P_{[i,j]}$ than is the pixel $P_{[i,j-2]}$, this latter pixel $P_{[i,j-2]}$ is weighted with a weighting of 2. Pixel $P_{[i,j-2]}$ gives the gradient of the pixel values between the pixel $P_{[i,j-2]}$ and the pixel $P_{[i,j-1]}$. The fifth prediction $\hat{P}5_{[i,j]}$ is carried out based on the two adjacent pixels in the column j, namely, pixels $P_{[i-1,j]}$ and pixel $P_{[i-2,j]}$ in similar fashion from the formula $$\hat{P}5_{[i,j]} = 2 \times P_{[i-1,j]} - P_{[i-2,j]}$$

The pixel $P_{[i-1,j]}$ being closest to the pixel $P_{[i,j]}$ is given a weighting of 2, while the pixel $P_{[i-2,j]}$ gives the gradient.

In this embodiment of the invention, the difference values between the five predicted values, $\hat{P}1_{[i,j]}$, $\hat{P}2_{[i,j]}$, $\hat{P}3_{[i,j]}$, $\hat{P}4_{[i,j]}$ and $\hat{P}5_{[i,j]}$ and the actual value of the pixel $P_{[i,j]}$ are computed and the median difference value of the five difference values is selected.

In the case of FIG. 7(f), the fourth and fifth predictions which for convenience are referred to as $\hat{P}6_{[i,j]}$ and $\hat{P}7_{[i,j]}$ are based on pixels which are diagonally aligned with the pixel $P_{[i,j]}$ from the formulae $$\hat{P}6_{[i,j]} = 2 \times P_{[i-1,j-1]} - P_{[i-2,j-2]}, \text{ and}$$

$$\hat{P}7_{[i,j]} = 2 \times P_{[i-1,j+1]} - P_{[i-2,j+2]}.$$

The closest pixels to the pixel $P_{[i,j]}$ of the diagonally aligned pixels, namely, pixels $P_{[i-1,j-1]}$ and $P_{[i-1,j+1]}$ are respectively weighted with a value of 2. The pixels $P_{[i-2,j-2]}$ and $P_{[i-2,j+2]}$ give the gradient of the pixel values between the pixels $P_{[i-2,j-2]}$ and $P_{[i-1,j-1]}$, and $P_{[i-2,j+2]}$ and $P_{[i-1,j+1]}$, respectively. In this case, the difference values between the five predicted values $\hat{P}1_{[i,j]}$, $\hat{P}2_{[i,j]}$, $\hat{P}3_{[i,j]}$, $\hat{P}6_{[i,j]}$ and $\hat{P}7_{[i,j]}$ and the actual value of the pixel $P_{[i,j]}$ are computed and the median difference value of the five difference values is selected.

By using five predictions as opposed to three, the median difference values, in general, will be closer to zero.

The method according to the invention may be implemented in hardware or software, typically, it will be implemented in software on a computer, however, it may be implemented in an integrated circuit chip. A typical computer programme in pseudo-code is set out in FIGS. 13 and 14, and a flow diagram of the computer programme is illustrated in FIG. 15. The computer programme will now be briefly described, however, it will be readily apparent to those skilled in the art that many other suitable programmes for implementing the method may be used without departing from the scope of the invention. The computer programme of FIGS. 13 and 14 makes two passes over the digital image. The first pass will be described with reference to FIG. 13, and the second pass will be described with reference to FIG. 14. The first pass comprises three functions. The first function is to prepare the greyscale values frequency array from the digital image. The second function is to calculate the greyscale value reduction and restoration look-up tables, in other words, the forward look-up table of FIG. 5(b) for preparing a reduced modified digital image and the inverse look-up table of FIG. 5(c) for restoring the modified reduced image to its original form after decompression. The third function determines the number of least significant bits to be separated from the greyscale value of each pixel for optimising noise reduction.

Line 1 of the programme clears the grey level frequency arrays. Lines 2 and 3 on scanning of the image prepares the frequency array of FIG. 5(a) by incrementing the greyscale value frequency count of each greyscale value as a pixel of that greyscale value is located in the image. Lines 4 and 5 create the forward looking look-up table of FIG. 5(b) and the inverse look-up table of FIG. 5(c). Lines 6, 7, 8 and 9 calculate for each bit plane starting with the least significant bit plane the entropy statistic and the run statistic. If either test indicates noise then the function breaks and increments the noise plane NR by one. Determination of the number of least significant bits to be separated using bit plane entropy statistics will be well known to those skilled in the art.

The second pass of the computer programme will now be described with reference to FIG. 14. Pass 2 comprises two programme functions. The first function outputs image header information for use in decompression, and the second function compresses the data in accordance with the method. Lines 1, 2 and 3 of the first function of the second pass forms the image header which includes the image width, height and bits per pixel. The header also includes the number of least significant bits separated for optimising noise reduction and the inverse look-up table for restoring the greyscale level of the compressed image to form the original image after decompression. This header information as well as other header information discussed above is outputted with the compressed image. The second programme function which compresses the image commences with Line 4 which calls Function 1 of the first pass to prepare the greyscale frequency array of FIG. 5(a). Line 5 of the second programme function of the second pass calls the second function of the first pass for calculating the forward look-up table and the inverse look-up table of FIGS. 5(b) and (c). Line 6 of the second programme function of the second pass calls the third function of the first pass, namely, the function which calculates the number of least significant bits to be separated. Line 7 of the second pass calls the output image header information. The second pass then moves on to Line 8, and for each pixel in the image, Line 8 applies the greyscale level reduction look-up table of FIG. 5(b) for preparing a modified image with numerical differences between the greyscale values occurring in the image reduced to unity. Line 9 of the second pass separates the appropriate number of least significant bits from the bit value of each pixel and then divides the remaining bit value of the pixel by $2^n$ where n equals the number of least significant bits separated for noise reduction. Line 10 of the second pass makes the relevant number of predictions of the value of each pixel and Line 11 compares the predicted values with the actual value of the pixel and computes the difference values between the respective predicted values and the actual value. Line 11 also selects the median difference value from the difference values of each pixel. Line 12 checks if the absolute median difference value is less than or equal to 6, and if so, Line 13 selects the appropriate variable length bit code corresponding to the median difference value from the look-up table of FIG. 9 and outputs the appropriate variable length bit code for the pixel. If it is determined that the absolute value of the median difference value is greater than 6 then Line 14 selects the appropriate code, namely, "Lit 1" or "Lit N" which is outputted and Line 15 outputs the actual pixel value after the relevant bit code "Lit 1" or "Lit N". Should a run of pixels occur where the actual value is to be outputted, the number of actual values in the run is outputted after the code for "Lit N" in a four bit code as already described. Line 16 outputs the separated least significant bits along with either the variable length bit code of each pixel or the actual value of each pixel as appropriate.

Turning now to FIG. 15 the flow diagram of the computer programme will now be briefly described. The digital image data is received and the predictor type is selected. This will normally be selected by the operator. In other words, the operator will select whether three predictions of pixel value are to be made for each pixel, five and possibly seven, and the operation will also determine the algorithms for making each prediction. The acquired digital image data is passed to block 1 which identifies the bit planes containing noise and determines the number of least significant bits to be separated, if any. The digital image data is also passed through block 2 which prepares the greyscale frequency array of the type illustrated in FIG. 5(a). The histogram of frequencies is then passed to block 3 which prepares the look-up table of the type of FIG. 5(b). The histogram of frequencies is also passed to block 4 which prepares the inverse look-up table of the type illustrated in FIG. 5(c) for restoring the image. The digital image data is also passed to block 5 which reduces the greyscale values of the image using an appropriate look-up table of the type of FIG. 5(b). The modified image resulting from block 5 is passed to block 6 where the number of least significant bits determined by block 1 are separated from the modified image. The modified image with the least significant bits having been separated is then passed to block 7 which prepares the relevant number of predictions of greyscale value for each pixel based on the selected number of predictions to be made, and compares the predicted values with the actual greyscale value of the pixel of the modified image and computes the difference values between the respective predicted values and the actual value. Block 7 then selects the median difference value of the difference values. Block 8 checks if the absolute value of the median difference value for each pixel is less than or equal to 6. If less than or equal to 6, the difference value is coded using the variable length codes of FIG. 9 by block 9. Should block 8 determine that the absolute value of the median difference value is greater than 6, the appropriate bit code "Lit 1" indicating an actual value is outputted by block 10 and the actual value of the pixel is subsequently outputted by block 11 to form a bit stream of the type of that of FIG. 12. The image may then be stored or transmitted or subjected to further known compression and then stored or transmitted.

The advantages of the invention are many. By virtue of the fact that a number of predictions of the greyscale value of each pixel are made, any noise which may occur in individual predicted values is separated by virtue of the fact that the median difference value based on the predictions is selected. By virtue of the fact that the code used for encoding the median difference values is a variable length bit code, efficient compression of data is achieved and by assigning the shortest codes to the median difference values most frequently occurring, further significant reduction of the compressed image is achieved.

Where the acquired image has already been modified by contrast stretching, reducing the numerical differences between the greyscale values occurring in the image to unity considerably improves the compression process. Since most naturally occurring images, typically, X-ray images, generally do not have sudden jumps in greyscale values between adjacent pixels, and thus if the differences between the greyscale values occurring in the image is unity, in general, the difference in greyscale values between adjacent pixels should be relatively low and commonly in the order of 0 to 6. This, thus, ensures that the median difference values between the predicted and actual values of pixels will be relatively small, and in most cases, below ±1, see the distribution of difference values of FIG. 10. This further enhances the reduction which can be achieved during compression. Separation of noise from the bit values of each pixel prior to compression further adds to the efficiency of compression, since it has been found that the compression of noise gives no benefit. The use of median values of the difference values achieves two important advantages in one step. Firstly, it combines the results of several matched predictions, and these matched predictions are selected to work well in combination and each one is selected to respond to particular features in the image data. Secondly, noise in a pixel on which an individual prediction is made is reduced by ignoring values of spurious predictions. This is important since the most effective predictions are based on a small matrix of immediate neighbouring values of pixels, and such predictions may be subject to considerable noise. This matrix of neighbourhood pixels which is available for predicting the value of the pixel $P_{[i,j]}$ can clearly be seen in FIG. 6. It will be apparent to those skilled in the art that only previous values of the current row and previous rows are available for prediction if the compression and decompression is performed in a scan line order.

In general, it has been found that the method according to the invention provides relatively high compression ratios typically of the order of 4:1, with no loss of image data.

It will be appreciated by those skilled in the art that since the first pixel in the first row and in the first column, in other words, pixel $P_{[1,1]}$ will be the first pixel to be scanned, it will not be possible to make a prediction for this pixel, and thus, the actual value of the first pixel will be bit packed in the bit stream in the appropriate manner as already described. Similarly, since it is not possible to base predictions for the pixels in the first row on pixels in a previously occurring row, a lesser number of predictions will be made for the pixels $P_{[1,2]}$ onwards in the first row. In cases where three predictions are being made as described with reference to FIGS. 7(a), (b), (c) and (d), in general, only the prediction of FIG. 7(a), namely, prediction P̂1 will be made for the pixels in the pixels from $P_{[1,2]}$ onwards for the first row. The difference values computed between the predicted values and the actual values of the relevant pixels will then be encoded. The header information stored and transmitted with the bit packed image will include the algorithm or algorithms used for making the predictions of the predicted values of the pixels in the first row of the image. It will be appreciated that where five predictions are being made of the greyscale value for each pixel using the predictions of FIGS. 7(e) or (f), it will not be possible to make five predictions for the pixels in the first two rows, and accordingly, these first two rows of the image will be treated as just described.

It will be appreciated that while the compression method has been described as comprising the eight steps of FIG. 2, as already discussed where an acquired image has not been altered with resultant gaps in greyscale values, Step 2 may be omitted. Similarly, in certain cases, Step 3 may be omitted. Firstly, Step 3 may be omitted if there is little noise in the acquired image, and even where there is noise in the acquired image, in certain cases, Step 3 may be omitted. Steps 4, 5 and 6 of FIG. 2 are essential to the invention, however, it will be appreciated that any odd number of predictions of pixel values may be made once there are at least three predictions in order to provide a median difference value. It will also be appreciated that while specific bit codes have been described for coding the median difference values, other suitable bit codes may be provided, although, as discussed above, it is important that the bit codes should be of the shortest length possible, and preferably, of variable length, the codes of shortest lengths being assigned to the most frequently occurring median difference values. While bit packing is essential to the invention, other suitable bit packing methods may be used.

As discussed above, it will be appreciated that the number of bits defining the greyscale value of each pixel is irrelevant to the method of the present invention. The method for compressing digital image data according to the invention may be used irrespective of the number of bits defining the greyscale values of the pixels. Indeed, it will be appreciated that the higher the number of bits which define the greyscale values of the pixels, the more efficient will be the compression. Furthermore, where more than eight bits are used for defining greyscale values, for example, ten to twelve bits, it is envisaged that where noise does occur, more than the two least significant bits may be separated from the value of each pixel if necessary, in certain cases, it is envisaged that up to four, and possibly, five least significant bits may be separated from the pixel value.

It will also be appreciated that the order in which the steps of the method according to the invention is carried out may be altered. For example, noise separation may be carried out on the acquired image prior to modification of the image to reduce the numerical differences between the greyscale values occurring in the image.

While the method has been described for use in compressing a digital X-ray image in black and white with greyscale, it will be appreciated that the method may also be used for compressing a digital colour image where the pixels define the intensities of the respective primary colours. In such cases, the image would comprise a set of three images, one for each of the three primary colours, and the image for each colour may be compressed separately, or, alternatively, the images may be compressed simultaneously, where either the rows or columns of pixels would correspond to a row or column of pixels extending from colour image to colour image.

The invention is not limited to the embodiment hereinbefore described which. may be varied in construction and detail.

What is claimed is:

1. A method for compressing digital image data, the method comprising the steps of sequentially scanning a plurality of regions of the image data and determining the actual values of the image data in respective regions, making at least three predictions of the value of image data for each of at least some of the regions based on the determined actual values of the image data of some of the already scanned regions which are adjacent to the region for which the value of image data is being predicted, comparing each of the at least three predicted values of image data with the actual value of image data of the corresponding region for each region for which a prediction is made, computing the values of the differences between the respective predicted values of image data and the actual value of image data for each region for which a prediction is made, selecting the median difference value of the at least three difference values for each region for which a prediction is made, and compressing the respective median difference values, wherein a first one of the at least three predictions of image data values of each region for which a prediction is being made is based on the actual image data value of a first region adjacent to the region for which the prediction is being made, the first region lying in a row in which the region for which the prediction is being made lies, a second one of the at least three predictions of image data values of each region for which a prediction is being made is based on the actual image data value of a second region adjacent to the region for which the prediction is being made, the second region lying in a column in which the region for which the prediction is being made lies, a third one of the at least three predictions of image data values of each region for which a prediction is being made is based on the gradients of actual image data values from a third region to the first region and from the third region to the second region, the third region being located adjacent to the first and second regions and lying in the row in which the second region lies, and in the column in which the first region lies, and at least some of the at least three predictions of image data values of each region for which a prediction is made are based on the actual image data values of at least two regions, one of which lies closer to the region for which the prediction is being made than the others of the said at least two regions, the actual image data values of the said at least two regions being weighted in proportion to their closeness to the region for which a prediction is being made.

2. A method as claimed in claim 1 in which the image data is scanned region by region as a matrix array of regions.

3. A method as claimed in claim 1 in which each third prediction of the image data value takes into account the slopes of the gradients.

4. A method as claimed in claim 1 in which the at least three predictions of image data values are made for every region of the digital image.

5. A method as claimed in claim 1 in which the respective median difference values are compressed by encoding the median difference values with respective variable length codes, unique codes being assigned to the respective median difference values.

6. A method as claimed in claim 5 in which the shortest code is assigned to the most frequently occurring median difference value, and the longest code is assigned to the least frequently occurring median difference value.

7. A method as claimed in claim 5 in which the codes are different for the positive and negative values of the same absolute median difference values.

8. A method as claimed in claim 5 in which the codes assigned to the median difference values are binary codes.

9. A method as claimed in claim 5 in which the bit length of the longest code for the median difference values does not exceed the bit length of the data value of any region.

10. A method as claimed in claim 5 in which the actual data value of a region is retained instead of the median difference value for each region for which the median difference value exceeds a predetermined value.

11. A method as claimed in claim 10 in which a first flag means is set to indicate that the data following the flag means is the actual data value of the region.

12. A method as claimed in claim 10 in which a second flag means is set to indicate a run of actual data values where the median difference values of a run of regions exceeds a predetermined value.

13. A method as claimed in claim 12 in which the number of actual data values included in the run is associated with the second flag means.

14. A method as claimed in claim 12 in which the second flag means is provided before the run of actual data values.

15. A method as claimed in claim 5 in which the coded median difference values and the actual data values for the respective regions are stored in a predetermined format for subsequent retrieval and decompression.

16. A method as claimed in claim 5 in which the most frequently occurring median difference value is assigned the value zero.

17. A method as claimed in claim 11 in which noise is separated from the image data by separating at least the least significant bit from the value of the data in the respective regions in which a prediction of the image data value is to be made, and from the regions on which the predictions are to be based prior to the prediction being made, and the separated least significant bits are stored in association with the corresponding compressed median difference values of the respective regions.

18. A method as claimed in claim 17 in which the data values remaining of the respective regions from which one or more least significant bits have been separated is divided by $2^n$ where n is equal to the number of least significant bits separated.

19. A method as claimed in claim 17 in which at least some of the digital image data is scanned prior to the separation of noise for determining the number of least significant bits to be separated.

20. A method as claimed in claim 1 in which the image data value of each region defines a value of greyscale between and including black and white.

21. A method as claimed in claim 1 in which the image data value of each region defines a value of intensity of a colour in a colour image.

22. A method as claimed in claim 1 in which the compressed data values of the digital image are stored in a predetermined format for retrieval thereof for subsequent decompression.

23. A method as claimed in claim 1 in which each region defines a pixel.

24. A method as claimed in claim 1 in which the digital image is in raster format.

25. A method as claimed in claim 1 in which the method is carried out on an acquired image after the image has been acquired.

26. A method as claimed in claim 1 in which the method is carried out on an acquired image while the image is being acquired "on-the-fly".

27. A method as claimed in claim 1 in which the method is carried out on the acquired image with intermediate storage or in parallel with intermediate storage.

28. A method as claimed in claim 1 in which the image in compressed form is suitable for storing and/or transmission.

29. A method as claimed in claim 1 in which the method is used for compressing a three dimensional image, and one of the axes of the three dimensional image is time, the time axis forming a row or column of the matrix, and that row or column forming the row or column as the case may be in which a region or regions are located which form a basis for predicting a data value of a region.

30. A method as claimed in claim 1 in which the method further comprises the step of decompressing the compressed image data, the decompression method comprising the steps in reverse order to the order of the steps of the compression method.

31. A method for compressing digital image data, the method comprising the steps of sequentially scanning a plurality of regions of the image data and determining the actual values of the image data in respective regions, modifying the image data values for reducing the numerical difference between the actual data values occurring in the image data, the image data values being modified by arranging the determined actual image data values occurring in the image data in the form of a series of actual image data values in ascending order of image data values, assigning each actual image data value occurring in the image a modified image data value so that the numerical difference between the adjacent modified image data values is less than the numerical difference between the respective adjacent actual image data values in the series, making at least three predictions of the value of image data for each of at least some of the regions based on the modified image data values of the image data of some of the already scanned regions which are adjacent to the region for which the value of image data is being predicted, a first one of the at least three predictions of image data values of each region for which a prediction is being made being based on the modified image data value of a first region adjacent to the region for which the prediction is being made, the first region lying in a row in which the region for which the prediction is being made lies, a second one of the at least three predictions of image data values of each region for which a prediction is being made being based on the modified image data value of a second region adjacent to the region for which the prediction is being made, the second region lying in a column in which the region for which the prediction is being made lies, and a third one of the at least three predictions of image data values of each region for which a prediction is being made being based on the gradients of modified image data values from a third region to the first region and from the third region to the second region, the third region being located adjacent to the first and second regions and lying in the row in which the second region lies, and in the column in which the first region lies, comparing each of the at least three predicted values of image data with the modified image data value of the corresponding region for each region for which a prediction is made, computing the values of the differences between the respective predicted values of image data and the modified image data value for each region for which a prediction is made, selecting the median difference value of the at least three difference values for each region for which a prediction is made, and compressing the respective median difference values.

32. A method as claimed in claim 31 in which the modified image data values are assigned so that the difference between modified image data values which correspond to adjacent actual image data values in the series of actual image data values is unity.

33. A method as claimed in claim 31 in which the modified image data values and the actual image data values are cross-referenced in a look-up table.

34. A method as claimed in claim 33 in which an inverse look-up table based on the modified and the actual image data values is prepared for use in subsequent reconstruction of the image.

35. A method as claimed in claim 33 in which each look-up table is stored with the stored compressed median difference values.

36. A method as claimed in claim 33 in which a histogram of the actual image data values occurring in the image data is formed for preparing each look-up table.

37. A method for compressing digital image data, the method comprising the steps of sequentially scanning a plurality of regions of the image data and determining the actual values of the image data in respective regions, modifying the image data values for reducing the numerical difference between the actual data values occurring in the image data, the image data values being modified by arranging the determined actual image data values occurring in the image data in the form of a series of actual image data values in ascending order of image data values, assigning each actual image data value occurring in the image a modified image data value so that the numerical difference between the adjacent modified image data values is less than the numerical difference between the respective adjacent actual image data values in the series, making at least three predictions of the value of image data for each of at least some of the regions based on the modified image data values of the image data of some of the already scanned regions which are adjacent to the region for which the value of image data is being predicted, comparing each of the at least three predicted values of image data with the modified image data actual value of the corresponding region for each region for which a prediction is made, computing the values of the differences between the respective predicted values of image data and the modified image data value data for each region for which a prediction is made, selecting the median difference value of the at least three difference values for each region for which a prediction is made, and compressing the respective median difference values.

38. A method for compressing digital image data, the method comprising the steps of sequentially scanning a plurality of regions of the image data and determining the actual values of the image data in respective regions, making at least three predictions of the value of image data for each of at least some of the regions based on the determined actual values of the image data of some of the already scanned regions which are adjacent to the region for which the value of image data is being predicted, comparing each of the at least three predicted values of image data with the actual value of image data of the corresponding region for each region for which a prediction is made, computing the values of the differences between the respective predicted values of image data and the actual value of image data for each region for which a prediction is made, selecting the median difference value of the at least three difference values for each region for which a prediction is made, and compressing the respective median difference values, wherein at least some of the at least three predictions of image data values of each region for which a prediction is made are based on the actual image data values of at least two regions, one of which lies closer to the region for which the prediction is being made than the others of the said at least two regions, the actual image data values of the said at least two regions being weighted in the proportion to their closeness to the region for which a prediction is being made.

39. Apparatus for compressing digital image data, the apparatus comprising a means for sequentially scanning a plurality of regions of the image data and for determining the actual values of the image data in respective regions, a means for making at least three predictions of the value of image data in each of at least some of the regions based on the determined actual values of some of the already scanned regions which are adjacent to the region for which the image data is being predicted, a means for comparing each of the at least three predicted values of image data with the actual value of image data of the corresponding region for each region for which a prediction is made, a means for computing the values of the differences between the respective predicted values of image data and the actual value of image data for each region for which a prediction is made, a means for selecting the median difference value for each region for which a prediction is made, and a means for compressing the respective median difference values, wherein, the means for making the at least three predictions comprises:

a means for making a first one of the at least three predictions of image data values which is based on the actual image data value of a first region adjacent to the region for which the prediction is being made, the first region lying in a row in which the region for which the prediction is being made lies, a means for making a second one of the at least three predictions of image data values which is based on the actual image data value of a second region adjacent to the region for which the prediction is being made, the second region lying in a column in which the region for which the prediction is being made lies, and a means for making a third one of the at least three predictions of image data values which is based on the gradients of actual image data values from a third region to the first region and from the third region to the second region, the third region being located adjacent to the first and second regions and adjacent to the region for which the prediction is being made and lying in the row in which the second region lies, and lying in the column in which the first region lies, and at least some of the means for making the first, second and third predictions of image data values of each region for which a prediction is being made comprises a means for making the prediction based on the actual image data values of at least two regions, one of which lies closer to the region for which the prediction is being made than the others of the said at least two regions, the actual image data values of the said at least two regions being weighted in proportion to their closeness to the region for which a prediction is being made.

* * * * *